(12) United States Patent
Loew et al.

(10) Patent No.: US 10,464,618 B2
(45) Date of Patent: Nov. 5, 2019

(54) TRUCK BED EXTENDER FORMED BY A RETRACTABLE TAILGATE STEP AND HANDLES

(71) Applicant: FORD GLOBAL TECHNOLOGIES, LLC, Dearborn, MI (US)

(72) Inventors: Pattrick Loew, Dearborn, MI (US); Brian Robert Spahn, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 15/185,633

(22) Filed: Jun. 17, 2016

(65) Prior Publication Data

US 2017/0361878 A1 Dec. 21, 2017

(51) Int. Cl.
| B62D 33/08 | (2006.01) |
| B60R 3/02 | (2006.01) |
| B62D 33/03 | (2006.01) |
| B62D 33/02 | (2006.01) |
| B62D 33/027 | (2006.01) |

(52) U.S. Cl.
CPC ............... *B62D 33/08* (2013.01); *B60R 3/02* (2013.01); *B62D 33/0207* (2013.01); *B62D 33/0273* (2013.01); *B62D 33/03* (2013.01)

(58) Field of Classification Search
CPC .. B62D 33/0273; B62D 33/037; B62D 33/03; B60P 3/40; B60P 1/435; B60P 7/0892; B60P 7/14; B60R 3/02
USPC ..... 296/62, 26.1, 26.11, 51, 61, 26.08, 37.6, 296/1.02; 280/166; 182/127, 97
See application file for complete search history.

(56) References Cited

U.S. PATENT DOCUMENTS

| 5,028,063 A | 7/1991 | Andrews |
| 5,205,603 A | 4/1993 | Burdette, Jr. |
| 5,788,311 A | 8/1998 | Tibbals |
| 6,364,392 B1 | 4/2002 | Meinke |
| 6,454,338 B1 | 9/2002 | Glickman et al. |
| 6,626,478 B1 | 9/2003 | Minton |
| 6,764,123 B1 | 7/2004 | Bilyard |
| 6,918,624 B2 | 7/2005 | Miller et al. |
| 6,935,671 B2 | 8/2005 | Bruford et al. |
| 6,988,756 B1 | 1/2006 | Meinke et al. |
| 7,090,276 B1 | 8/2006 | Bruford et al. |

(Continued)

OTHER PUBLICATIONS

Non-Final Office Action dated May 23, 2017 for Utility Patent Application Serial No. 15/178,858, filed Jun. 7, 2016.

(Continued)

*Primary Examiner* — D Glenn Dayoan
*Assistant Examiner* — Sunsurraye Westbrook
(74) *Attorney, Agent, or Firm* — Jason Rogers; Vichit Chea; King & Schickli, PLLC

(57) ABSTRACT

An apparatus for extending a vehicle bed includes a tailgate for raising and lowering relative to the vehicle bed. The tailgate includes a retractable member adapted for extending vertically from the tailgate when lowered, and also for extending horizontally from the tailgate to form a handle. A ladder supported by the tailgate is adapted for moving from a lowered position for use in stepping into the vehicle bed using the handle to a raised position for connecting with the retractable member when oriented vertically from the tailgate, thus extending the effective length of the vehicle bed.

20 Claims, 6 Drawing Sheets

(56) References Cited

U.S. PATENT DOCUMENTS

| | | | |
|---|---|---|---|
| 7,168,722 B1* | 1/2007 | Piotrowski | B60R 3/02 |
| | | | 280/166 |
| 7,234,749 B1 | 6/2007 | Firzlaff et al. | |
| 7,267,387 B1 | 9/2007 | Bruford et al. | |
| 7,469,915 B2* | 12/2008 | Horn | E06C 9/08 |
| | | | 182/127 |
| 7,472,938 B2 | 1/2009 | Firzlaff et al. | |
| 7,488,021 B1 | 2/2009 | Roos et al. | |
| 7,712,811 B2 | 5/2010 | Heaman et al. | |
| 8,146,786 B2* | 4/2012 | Cheung | B62D 33/0273 |
| | | | 224/402 |
| 8,201,869 B1* | 6/2012 | Butlin, Jr. | B62D 33/0273 |
| | | | 296/57.1 |
| 9,302,719 B1 | 4/2016 | Krishnan et al. | |
| 9,452,782 B1* | 9/2016 | Singer | B62D 33/0273 |
| 9,517,711 B2* | 12/2016 | Krajenke | B60R 3/00 |
| 2005/0013325 A1 | 1/2005 | Choi et al. | |
| 2008/0136208 A1 | 6/2008 | Kuznarik et al. | |
| 2009/0072571 A1* | 3/2009 | Elliott | B60R 3/007 |
| | | | 296/62 |
| 2011/0168491 A1* | 7/2011 | Cheatham, Jr. | E06C 7/182 |
| | | | 182/106 |
| 2011/0192874 A1* | 8/2011 | McCurry | B60R 9/0485 |
| | | | 224/539 |

OTHER PUBLICATIONS

Final Office Action dated Nov. 17, 2017 for Utility Patent Application Serial No. 15/178,858, filed Jun. 7, 2016.

* cited by examiner

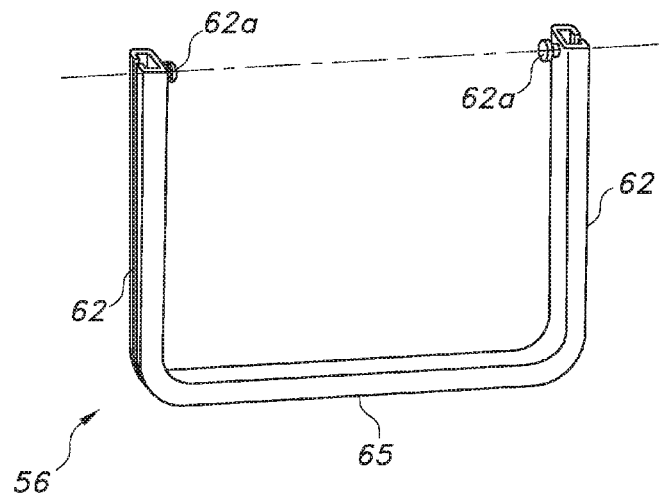
FIG. 5
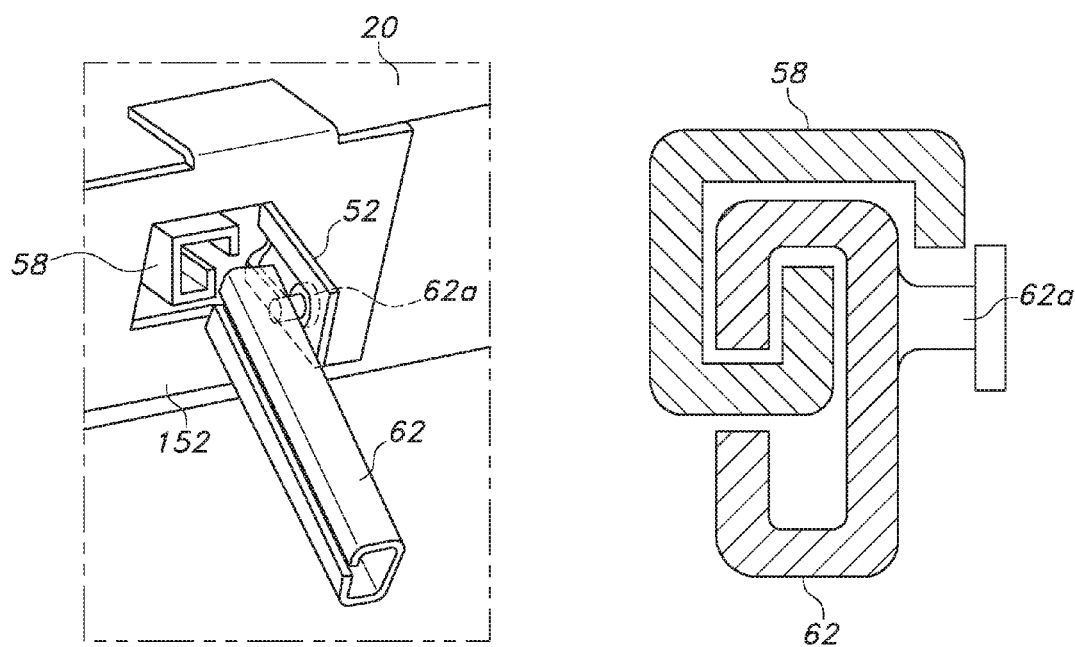
FIG. 6
FIG. 7

TRUCK BED EXTENDER FORMED BY A RETRACTABLE TAILGATE STEP AND HANDLES

TECHNICAL FIELD

This document relates generally to the motor vehicle field and, more particularly, to a truck bed extender formed by a retractable tailgate step and handles for use when climbing into the truck bed using the step when deployed.

BACKGROUND

For various reasons, it may be desirable to extend the effective length of a truck bed, such as for hauling a particularly long piece of cargo that would not fit in the bed with the tailgate in the raised position. In some cases, this is done by lowering the tailgate and placing a separate cage-like structure comprised of stacked, curved bars on it to help contain the cargo within the resulting extension created by the lowered tailgate. While effective, this arrangement requires using a large, separate component for placement on the lowered tailgate, which must be stored apart from the truck when not in use.

Thus, a need is identified for a bed extender that can be easily stowed when not in use, and capable of being readily deployed for extending the effective length of the bed in a sturdy and reliable manner.

SUMMARY

In accordance with the purposes and benefits described herein, an apparatus for extending a vehicle bed includes a tailgate for raising and lowering relative to the vehicle bed, the tailgate including a retractable member extending vertically from the tailgate when lowered. A ladder supported by the tailgate is adapted for moving from a lowered position for use in stepping into the vehicle bed to a raised position for connecting with the retractable member when oriented vertically from the tailgate.

In one embodiment, the tailgate comprises first and second retractable members for extending vertically from the tailgate when lowered. The ladder may include a transverse portion wider than a space between the first and second retractable members, such that the transverse portion of the ladder engages the retractable members in the vertical orientation. The transverse portion of the ladder may include a connector for connecting with one of the first or second retractable members, and may also include a cutout for receiving one of the first or second retractable members.

In one embodiment, the ladder includes first and second telescoping supports connected to the tailgate. Each telescoping support includes an extendable portion adapted for pivoting relative to the tailgate to the raised position. The first and second retractable members may comprise telescoping supports at least partially recessed within a cavity of the tailgate.

A connector may also be provided for extending from one side of the vehicle bed to adjacent the retractable member in the vertical orientation. The connector may be flexible, such as a cable, or a more rigid rod or rod-like structure. The connector may also comprise a plurality of gates hingedly connected for moving between an expanded configuration and a collapsed configuration.

According to another aspect of the disclosure, an apparatus for extending a vehicle bed including a tailgate comprises first and second retractable members for moving from a retracted position within the tailgate to an extended position projecting from the tailgate in a vertical orientation. A transverse connector is provided for removably attaching to the first and second retractable members in the vertical orientation. The transverse connector includes a receiver for receiving one of the first and second retractable members in the extended position.

In one embodiment, the transverse connector includes a first receiver for receiving the first retractable member and a second receiver for receiving the second retractable member. Third and fourth retractable members may be connected to the transverse connector. The third and fourth retractable members may be mounted for pivoting relative to the tailgate to achieve a lowered position relative to the tailgate.

The transverse connector may comprise a step or a cross bar formed of first and second interconnected portions. A connector, such as a cable or rod, may also extend from one side of the vehicle bed to adjacent the retractable member in the vertical orientation. The connector may also take the form of a plurality of gates hingedly connected together for moving between an expanded configuration and a collapsed configuration.

A further aspect of the disclosure pertains to an apparatus for extending a vehicle bed. The apparatus comprises a tailgate for raising and lowering relative to the vehicle bed, the tailgate includes a ladder supported by the tailgate and adapted for moving from a lowered position for use in stepping into the vehicle bed to a raised position, and one or a pair of handles connected to the tailgate for connecting with the ladder in the raised position to extend the vehicle bed. The handles may be telescoping and pivotable to the vertical orientation, or may be removably connected to the tailgate.

In the following description, there are shown and described several preferred embodiments of the truck bed extender. As it should be realized, the arrangement is capable of other, different embodiments and its several details are capable of modification in various, obvious aspects all without departing from the truck bed extender as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the truck bed extender and together with the description serve to explain certain principles thereof. In the drawing figures:

FIG. 5 is a perspective view of a frame forming part of the retractable ladder according to one possible embodiment;

FIG. 6 is a cutaway perspective view illustrating one possible mechanism for allowing pivoting of the ladder between a lowered and a raised position;

FIG. 7 is a cross-sectional view of the retractable support and associated receiver for the ladder;

Reference will now be made in detail to the present preferred embodiments of the truck bed extender, examples of which are illustrated in the accompanying drawing figures.

DETAILED DESCRIPTION

Figure 1:
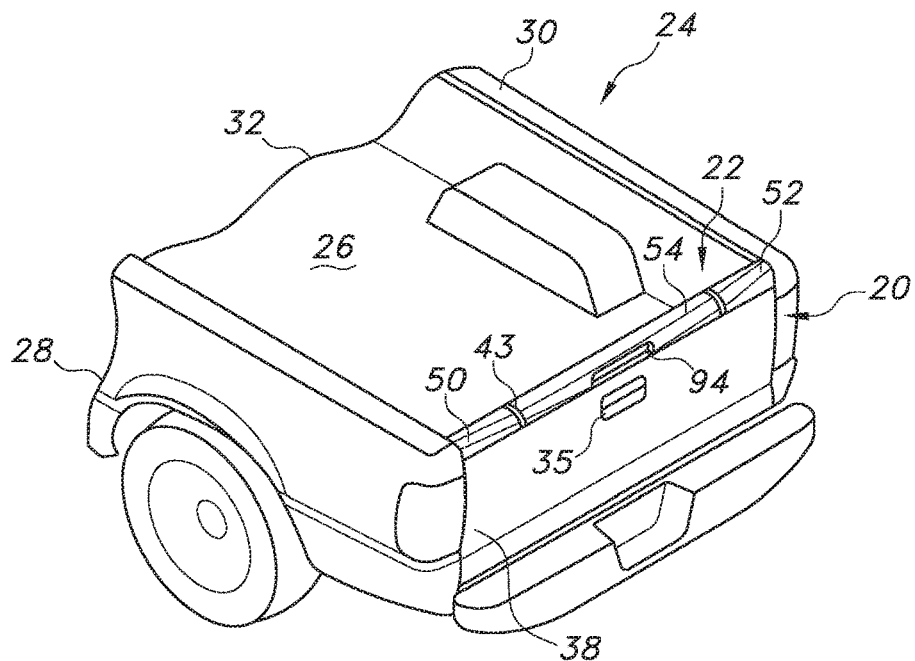
FIG. 1 is a partially cutaway, rear perspective view of a vehicle bed including a tailgate with a ladder in a retracted position.

Reference is now made to FIG. 1, which illustrates a tailgate 20 including a retractable ladder 22. The tailgate 20 is adapted to mount to a vehicle 24, such as a pickup truck. The vehicle 24 includes a storage compartment or bed 26 that is defined by a left rear quarter panel 28, which forms a first vertical surface of the bed 26; a right rear quarter panel 30, which forms a second vertical surface of the bed 26; a floor 32, which extends between the two panels 28, 30; and the tailgate 20.

Figure 3:
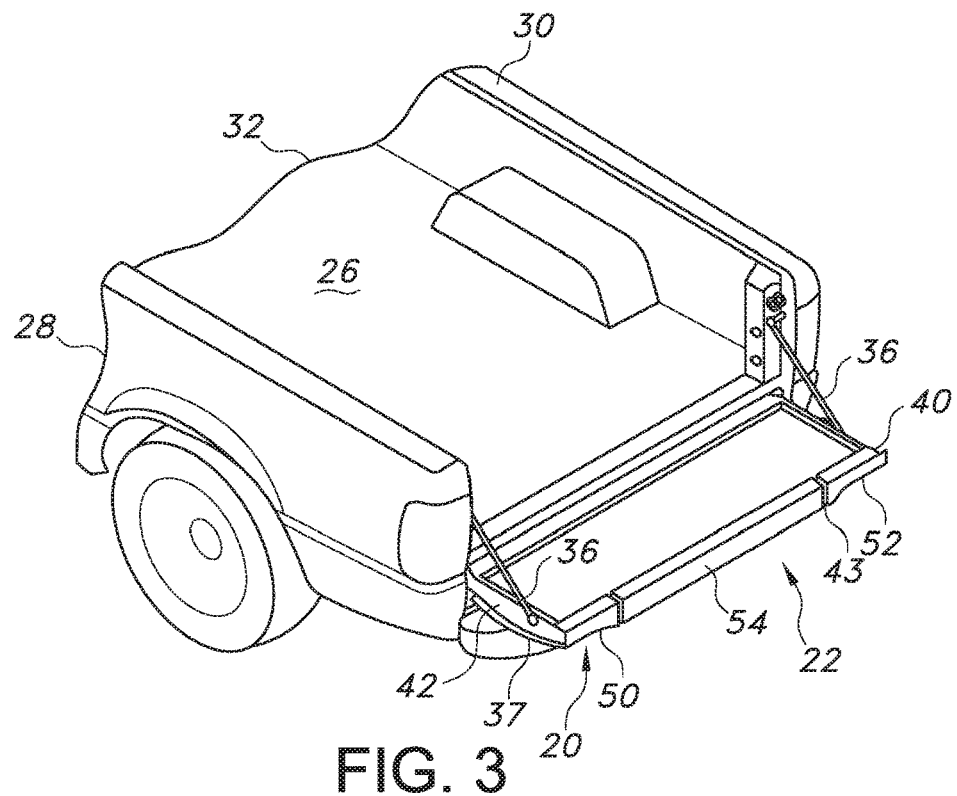
FIG. 3 is a similar view with the tailgate in the lowered position, ready for loading the bed with cargo.

As can be understood by comparing FIGS. 1 and 3, the tailgate 20 is pivotable between a generally vertical closed position and a generally horizontal open position to open and close the bed 26. In this regard, and as perhaps best shown in FIG. 9, the tailgate 20 includes a pair of tailgate hinges 34 that cooperate with the side panels 28, 30. A pair of tailgate supports 36 connected to these panels 28, 30 support the tailgate 20 when in the lowered or horizontal position. A tailgate handle 35 mounts to an outer panel 38, and functions in a conventional manner. The release mechanism for the tailgate 20, as well as tailgate latches, are conventional and well known in the art and so are not shown in detail.

The tailgate 20 includes a tailgate frame 37, which forms the outer finished surface of the tailgate 20, and an inner panel 40, which mounts to the outer panel 38 and forms the inner surface and sides 42 of the tailgate 20. The outer panel 38 and inner panel 40 combine to form a channel 68. Other tailgate reinforcement members (not shown) and brackets (not shown) may be mounted within the frame 37 to provide structural support to the frame outer and inner panels 38, 40.

A left tailgate molding 50 and a right tailgate molding 52 may form the upper surfaces of the tailgate 20. These moldings 50, 52 help to prevent paint scratches on metal parts when cargo is being loaded over the top of a closed tailgate 20. The moldings 50, 52 may be made of colored plastic that is the desired color of the parts, which eliminates the need to paint them.

Figure 2:
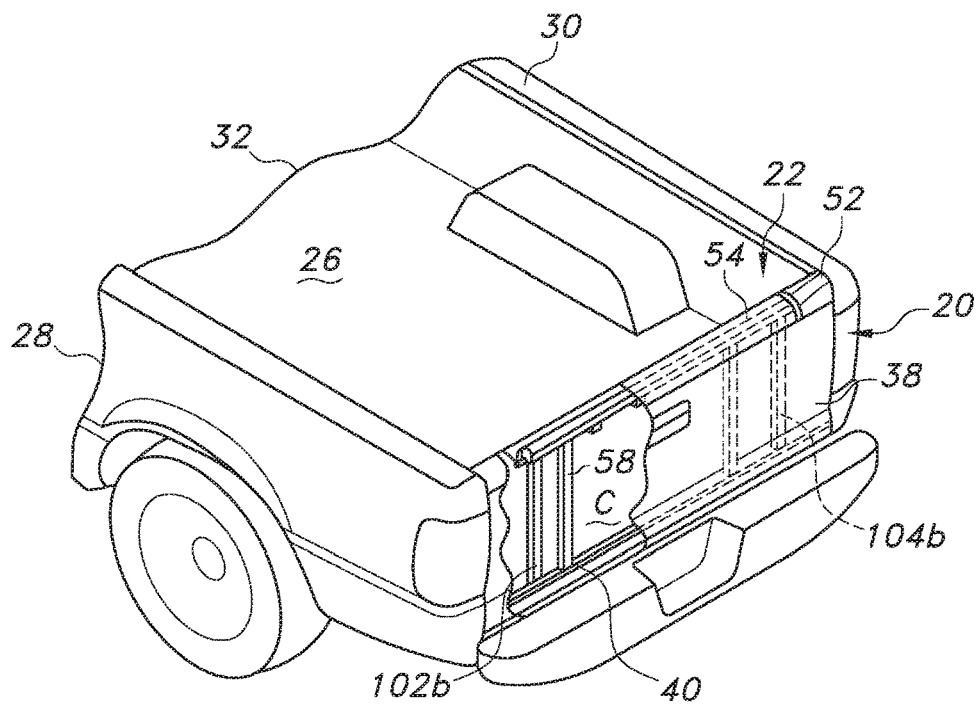
FIG. 2 is a similar view, with a cutaway illustrating an interior portion of the tailgate to show certain of the structures forming the ladder.

The components that make up the tailgate frame 37 are formed so that a hollow internal cavity C is created, as indicated by the partially cutaway view provided in FIG. 2. Within this cavity C, the ladder 22 is retained in the retracted configuration. In one embodiment, as shown in FIGS. 5-7, the ladder 22 includes a transverse portion 54 (which together with moldings 50, 52 form the upper end surface of the tailgate 20), a movable frame portion 56, and guide rails 58. As can be understood with reference to FIG. 6, the guide rails 58 may be hollow, generally rectangular tubes fixed to the tailgate frame 37 and support the movable frame portion 56 as it is telescopically extended from and retracted into the guide rails 58, which may be fastened to the inner panel 40 in order to help secure the guide rails to the tailgate 20.

With continued reference to FIGS. 5 and 6, the movable frame portion 56 includes a pair of supports 62 that may retracted into and extend from the respective guide rail 58. Each support 62 is received telescopically in a respective one of the guide rails 58. The supports 62 may be separate structures connected to the transverse portion 54, or may include a cross member 65 that connects them to form a generally U-shaped structure, as shown in FIG. 5. Each support 62 also includes a pivot pin 62a, which may interface with a pivot bracket 52 connected to the tailgate 20.

To deploy the ladder 22 from its stowed position, one grasps the transverse portion 54. One then pulls on the transverse portion 54 to telescopically slide the supports 62 relative to the guide rails 58. Once the movable frame portion 56 slides out to a predetermined extended position relative to the tailgate 20 to engage the pin 62a with bracket 58, it can pivot downward until the supports 62 engage stops 152. The size and location of the stops 152 determines the downward angle at which the supports 62 engage the structural stops 152. This angle can be any angle that is deemed most convenient for positioning of an assist step.

After the frame portion 56 is in this downward extending, generally vertical orientation, one may use a hand or foot to pivot a flip step 153 connected to the transverse portion 54 by a hinge 159 from its closed position resting against the support 62 to its open position generally flush and coplanar with the support and extending toward the vehicle 24. The ladder 22 is now in its step assist position (as best seen in FIG. 4).

Figure 4:
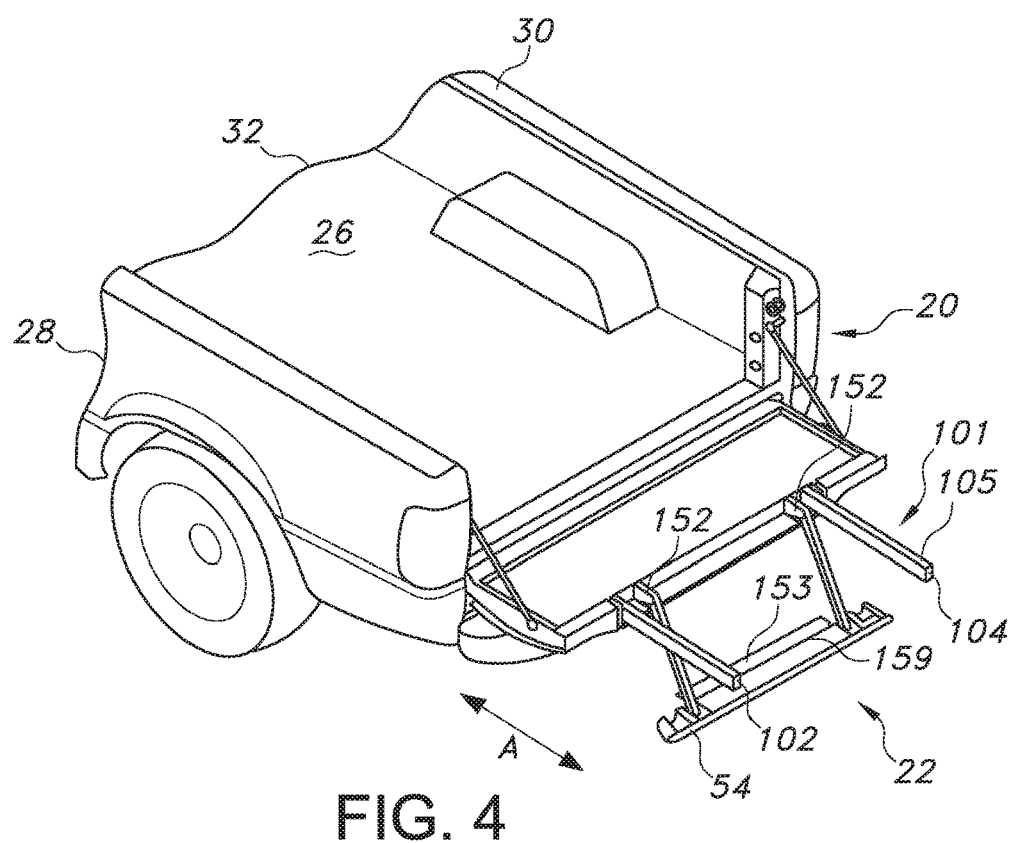
FIG. 4 is a similar view showing a railing formed by extendable rails and a retractable ladder in a lowered position, ready for use in stepping into the bed from the ground.

With reference to FIG. 4, it can also be understood that the tailgate 20 may include an extendable railing 101 to provide support for a person when using the ladder 22 in the deployed or lowered position. In one embodiment, this railing 101 includes one or more spaced, elongated handles, which in the illustrated embodiment take the form of first and second retractable supports or members 102, 104, one positioned on each side of the ladder 22. In the illustrated embodiment, these members 102, 104 are connected to and adapted for being withdrawn from the tailgate 20 in the active condition, and for returning to a retracted position within it in an inactive condition. As shown in FIG. 7, each member 102 (only one shown) may include an extendable portion 102a that telescopes into another member, such as a tubular receiver 102b, associated with and fixed to the tailgate 20.

Figure 8:
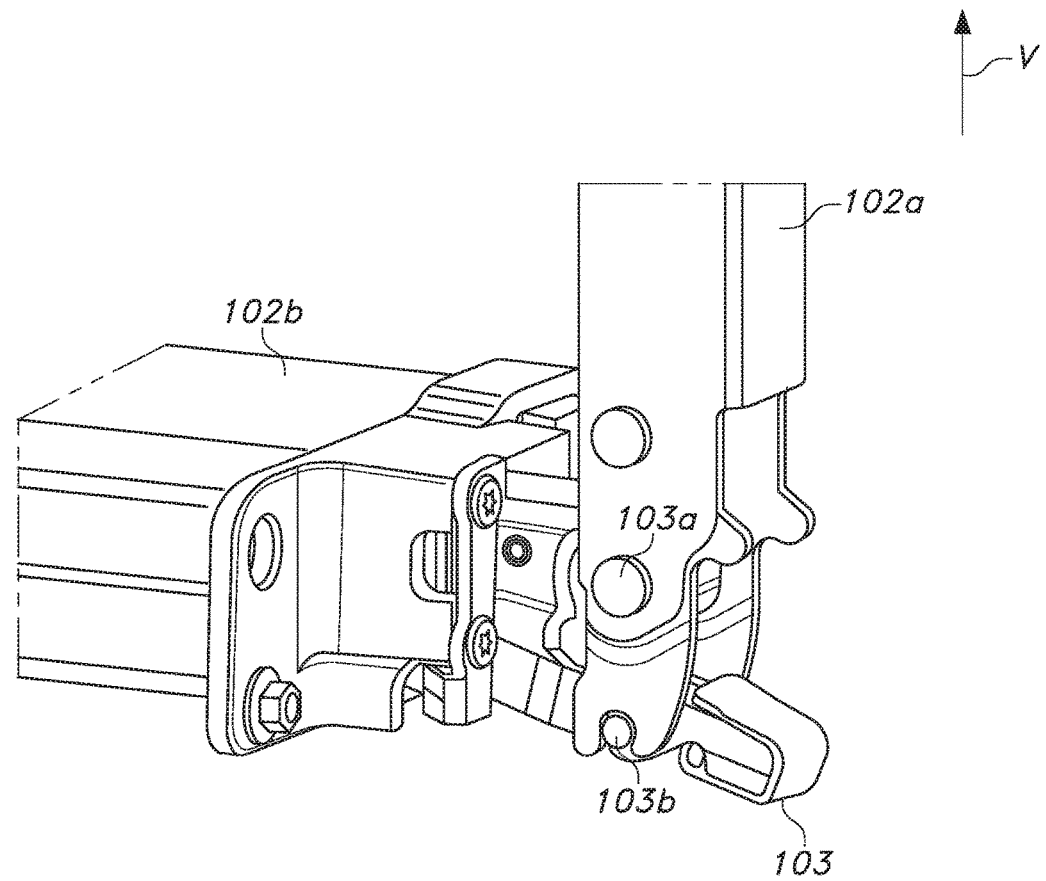
FIG. 8 illustrates a retractable handle pivoted to a vertical position.

As indicated in FIG. 8, the extendable portion 102a of the retractable member 102 may also be adapted for pivoting relative to the receiver 102b when fully extended so as to project in a generally vertical direction V. Specifically, the extendable portion 102a may be connected to a support 103 connected to the receiver 102b by a pivot pin 103a, which allows for pivoting movement from a horizontal to a vertical orientation. A locking pin 103b may engage a notch in the extendable portion 102a to retain it in the vertical position once pivoted. As can be appreciated, a similar arrangement may be provided for the retractable member 104. Additional details of pivoting handles that may work in connection with this disclosure may be found in U.S. Pat. No. 9,302,719 and U.S. Patent Application Publication No. US20150336622, the disclosures of which are incorporated herein by reference.

According to one aspect of the disclosure, the ladder 22 and one or both of the retractable members 102, 104 (if two are present) may be combined to form a retractable bed extender 200 for use in combination with the existing vehicle bed 26. Specifically, with reference to FIG. 9, the extended portions 102a, 104a of retractable members 102, 104 forming railing 101 in the extended position may be pivoted upwardly to a vertical (which term for purposes of the disclosure includes a substantially vertical) orientation (note arrow V). Likewise, the ladder 22 may also be pivoted from the lowered position to a vertical position. As can be appreciated from FIG. 10, the transverse portion 54 of the ladder 22 may have a corresponding dimension, or width, equal to or greater than the spacing between members 102, 104. Consequently, the transverse portion 54 may engage the members 102, 104 when the two are in a similar vertical orientation, and thereby be supported.

Figure 10:
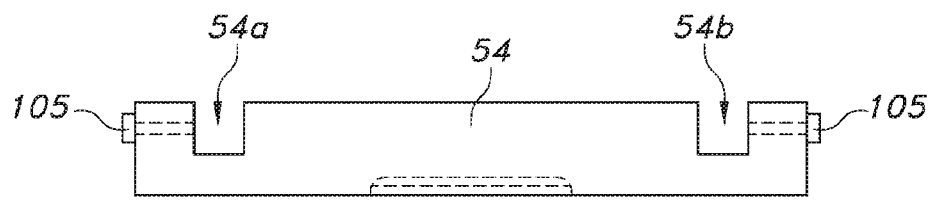
FIG. 10 is an end view of a transverse portion of a ladder forming part of the bed extender.

The ladder 22 may be adapted for releasably engaging the members 102, 104 in the extended position. Specifically, as shown in FIG. 10, the transverse portion 54 may include one or more receivers, such as openings or cutouts 54a, 54b for receiving the corresponding end portions of the members 102, 104. The transverse portion 54 may also include connectors, such as fixed or removable pins 105, for positioning in one or more openings in the members 102, 104 to form a secure, but releasable engagement when the bed extender 200 is vertically oriented. As should be appreciated, the arrangement may be reversed with the same result, with the connectors or pins 105 provided on the members 102, 104 for passing into the transverse portion 54.

Figure 9:
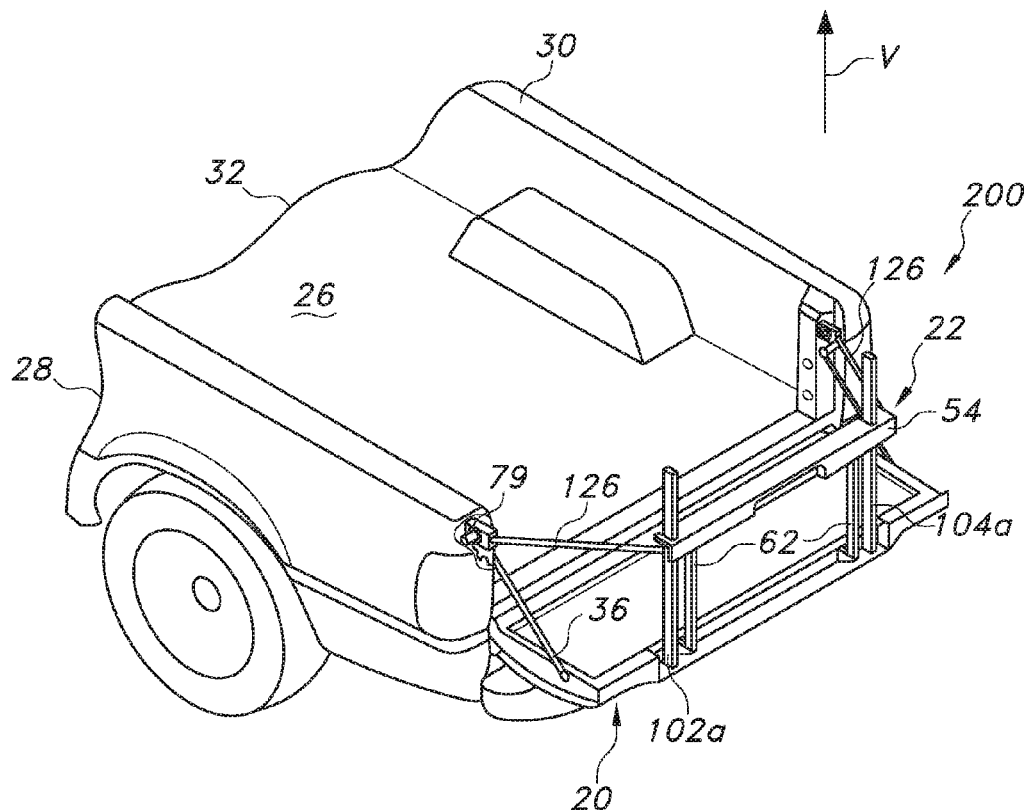
FIG. 9 is a partially cutaway perspective view of the vehicle bed taken from the rear, illustrating a retractable bed extender.

It should also be appreciated that the ladder 22 may be lowered from the raised configuration shown in FIG. 9 without altering the position of the extended portions 102a, 104a of members 102, 104. When left in this vertical orientation, the extended portions 102a, 104a may be used as handles for climbing into the bed 26 of the vehicle 24 when the ladder 22 is lowered.

The bed extender 200 when formed using the ladder 22 and the extended portions 102a, 104a of members 102, 104 may also be associated with auxiliary components for forming a connection with the panels 28, 30 of the vehicle 24. For example, as also shown in FIG. 9, a connector, such as a cable or rod 126, may be extended between a support 79 attached to the vehicle 24 and a corresponding extended portion 102a, 104a of retractable member 102, 104 when vertically oriented. The cable or rod 126 may simply be withdrawn or retracted when the bed extender 200 is not needed.

Figure 11:
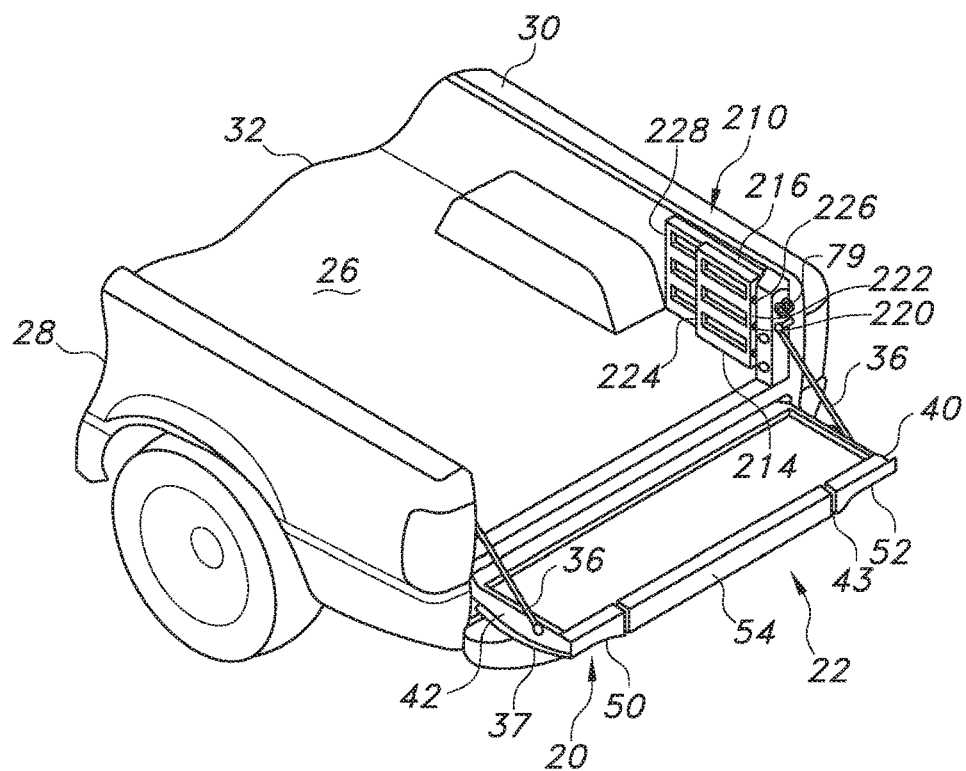
FIGS. 11 and 12 are partially cutaway perspective and top views of another embodiment of the truck bed extender in the non-deployed and deployed configurations.
Figure 12:
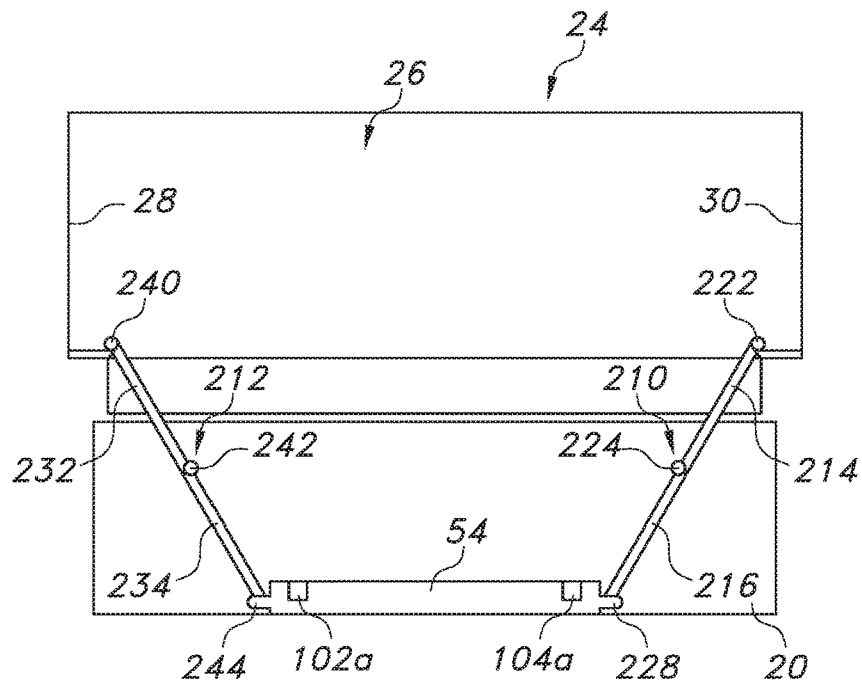

Likewise, as shown in FIGS. 11 and 12, the vehicle 24 may include also include a right hand gate assembly 210 and a left hand gate assembly 212, which may initially be folded as indicated with respect to right hand assembly 210 in FIG. 11 to minimize interfering with cargo. The right hand gate assembly 210 includes a first right hand gate 214 and a second right hand gate 216. The right hand gate assembly 210 also includes a right hand hinge plate 220, which is bolted to the right hand rear quarter panel 30 on the inside of the bed 26, and a first right hand hinge 222, which pivotally couples the first right hand gate 214 to the right hand hinge plate 220. A second right hand hinge 224 pivotally couples the first right hand gate 214 to the second right hand gate 216. The second right hand gate 218 also includes a right hand gate connector 228 extending from the main portion of the gate 218, which may be used to connect to the transverse portion of the ladder 54 of the extended portion 104a of member 104.

The left hand tailgate assembly 212 includes a first left hand gate 232 and a second left hand gate 234. The first left hand gate 232 connects to the left rear quarter panel 28 of the bed 26 with a first left hand hinge 240, similar to the right hand side. A second left hand hinge 242 pivotally couples the first left hand gate 232 to the second left hand gate 234, and a connector 244 may be provided for connecting with the transverse portion of the ladder 54 of the extended portions 102a of member 102.

As with moldings 50, 52, the transverse portion 54 of ladder 22 may be molded with the plastic being the desired final color so that it does not have to be painted. This transverse portion 54 may also include a pocketed handle 94 that provides for ease of gripping and pivoting the transverse portion 54 when deploying the ladder 22. The transverse portion 54 also may have an overall width that is just smaller than a gap 43 formed between the two tailgate moldings 50, 52, and a top surface flush with the corresponding surfaces of the tailgate moldings 50, 52.

Additionally, if so desired, the two tailgate moldings 50, 52 may include recessed flanges (not shown) that nest under the edges of the transverse portion 54. Accordingly, the transverse portion 54 of the ladder 22, when in its fully retracted position, blends in with the tailgate 20. Thus, the ladder 22 may be included without detracting from the esthetically pleasing look of the vehicle 24, and still allows the sliding of cargo into and out of the bed 26 over the top of a closed tailgate 20 without creating paint scratch concerns.

In summary, numerous benefits are provided by providing a retractable bed extender 200 for a vehicle 24 including a tailgate 20, such as a pick-up truck. The extender 200 may be formed from an existing ladder 22 in a generally vertical with retractable members 102, 104, which may alternately serve as a railing 101 for aiding in using the step to enter the bed 26. A more secure and stable arrangement results, and one that does not require storage apart from the tailgate 20.

While one embodiment of a ladder 22 is described above, further details of similar arrangements may be found in U.S. Pat. Nos. 6,918,624, 7,090,276, and 7,234,749, the disclosures of which are incorporated herein by reference. The disclosures of U.S. Pat. Nos. 7,488,021, and 7,267,387 are also incorporated herein by reference.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for extending a vehicle bed, comprising:
   a tailgate for raising and lowering relative to the vehicle bed, the tailgate including a retractable member adapted for extending vertically from the tailgate when lowered; and
   a ladder supported by the tailgate and adapted for moving from a lowered position for use in stepping into the vehicle bed to a raised position for connecting with the retractable member when oriented vertically from the tailgate.

2. The apparatus of claim 1, wherein the tailgate comprises first and second retractable members for extending vertically upright from the tailgate when lowered.

3. The apparatus of claim 2, wherein the ladder includes a transverse portion wider than a space between the first and second retractable members, such that the transverse portion of the ladder engages the first and second retractable members in the vertically upright orientation.

4. The apparatus of claim 3, wherein the transverse portion of the ladder includes a connector for connecting with one of the first or second retractable members.

5. The apparatus of claim 3, wherein the transverse portion of the ladder includes a cutout for receiving one of the first or second retractable members.

6. The apparatus of claim 2, wherein the ladder comprises first and second telescoping supports connected to the tailgate, each telescoping support including an extendable portion adapted for pivoting relative to the tailgate to the raised position.

7. The apparatus of claim 2, wherein the first and second retractable members comprise telescoping supports at least partially recessed within a cavity of the tailgate.

8. The apparatus of claim 1, further including a connector for extending from one side of the vehicle bed to adjacent the retractable member in the vertical orientation.

9. The apparatus of claim 8, wherein the connector comprises a cable or rod.

10. The apparatus of claim 8, wherein the connector comprises a plurality of gates hingedly connected for moving between an expanded configuration and a collapsed configuration.

11. A vehicle including the apparatus of claim 1.

12. An apparatus for extending a vehicle bed including a tailgate, comprising:
    first and second retractable members for moving from a retracted position within the tailgate to an extended position projecting from the tailgate in a vertical orientation; and
    a transverse connector for removably attaching to the first and second retractable members in the vertical orientation, the transverse connector including a receiver for receiving one of the first and second retractable members in the extended position.

13. The apparatus of claim 12, wherein the transverse connector includes a first receiver for receiving the first retractable member and a second receiver for receiving the second retractable member.

14. The apparatus of claim 12, further including third and fourth retractable members connected to the transverse connector, the third and fourth retractable members being mounted for pivoting relative to the tailgate to achieve a lowered position relative to the tailgate.

15. The apparatus of claim 12, wherein the transverse connector comprises a step or a cross bar formed of first and second interconnected portions.

16. The apparatus of claim 12, further including a connector for extending from one side of the vehicle bed to adjacent the first or second retractable member in the vertical orientation.

17. The apparatus of claim 16, wherein the connector comprises a cable or rod.

18. The apparatus of claim 16, wherein the connector comprises a plurality of gates hingedly connected together for moving between an expanded configuration and a collapsed configuration.

19. A vehicle including the apparatus of claim 12.

20. An apparatus for extending a vehicle bed, comprising:
    a tailgate including a ladder adapted for moving from a lowered position for use in stepping into the vehicle bed to an upright position, and at least one handle connected to the tailgate for assisting in stepping into the vehicle bed with the ladder in the lowered position and for connecting with the ladder in the upright position to extend the vehicle bed.

* * * * *